(12) United States Patent
Jang et al.

(10) Patent No.: US 8,404,608 B2
(45) Date of Patent: Mar. 26, 2013

(54) RF NON-THERMAL PLASMA TECHNIQUES FOR CATALYST DEVELOPMENT TO IMPROVE PROCESS EFFICIENCIES

(75) Inventors: Wen-Long Jang, Commerce, TX (US); Chalita Ratanatawanate, Dallas, TX (US)

(73) Assignee: The Texas A&M University System, College Station ( * ) Notice: Subject to any disclaimer, the term of this patent is extended or adjusted under 35 U.S.C. 154(b) by 1448 days.

(21) Appl. No.: 11/848,825

(22) Filed: Aug. 31, 2007

(65) Prior Publication Data

US 2009/0163355 A9  Jun. 25, 2009

Related U.S. Application Data

(63) Continuation of application No. PCT/US2006/007164, filed on Mar. 1, 2006.

(60) Provisional application No. 60/658,933, filed on Mar. 4, 2005.

(51) Int. Cl.
*B01J 37/34* (2006.01)
(52) U.S. Cl. .......................................................... 502/5
(58) Field of Classification Search .................. 204/164; 502/5
See application file for complete search history.

(56) References Cited

U.S. PATENT DOCUMENTS 3,485,771 A    12/1969  Horvath
5,830,329 A *  11/1998  Stewart et al. ................ 204/165

OTHER PUBLICATIONS

Zhang et al., "A Plasma-Activated Ni/α-Al2O3 Catalyst for the Conversion of CH4 to Syngas", Plasma Chemistry and Plasma Processing, vol. 20, No. 1, 2000, p. 137-144.*
International Search Report and Written Opinion of the International Searching Authority issued in PCT/US2006/007164; Jun. 29, 2006; 7 pages.

* cited by examiner

*Primary Examiner* — Kishor Mayekar
(74) *Attorney, Agent, or Firm* — Novak Druce Connolly Bove + Quigg LLP

(57) ABSTRACT

Plasma modifications of catalyst supports before and after impregnation of metal precursors improve the activity, selectivity and stability of catalysts, e.g. Ni catalysts for benzene hydrogenation and Pd catalysts for selective hydrogenation of acetylene. Plasma modification of the support before impregnation is slightly more effective than the plasma modification after impregnation. However, plasma modifications after impregnation increase the stability and selectivity of catalysts more effectively. The economic benefit of much improved stability of Ni catalysts for hydrogenation of benzene and the enhanced activity and selectivity of Pd catalysts for acetylene hydrogenation, e.g., is significant. Similar benefits for various catalysts and other industrial processes via RF plasma techniques are expected.

12 Claims, 8 Drawing Sheets

RF NON-THERMAL PLASMA TECHNIQUES FOR CATALYST DEVELOPMENT TO IMPROVE PROCESS EFFICIENCIES

CROSS REFERENCE TO RELATED APPLICATIONS

This is a continuation of International Application Serial No. PCT/US2006/007164, filed Mar. 1, 2006, which claims priority from U.S. Provisional Application Ser. No. 60/658,933, filed Mar. 4, 2005.

TECHNICAL FIELD

The present invention relates to methods for making supported metal catalysts and catalysts made thereby, and, in one non-limiting embodiment, to methods for improving the activity, selectivity and/or stability of supported metal and metal oxide catalysts.

BACKGROUND

Conventional catalyst preparation techniques or thermal plasma techniques are high temperature processes which are energy intensive. Conventional high temperature calcinations and reduction may have disadvantages including, but not necessarily limited to, decreased surface area, loss of active species, use of large amounts of energy, lengthy process time, etc.

Plasmas are conductive assemblies of charged particles, neutral particles and fields that exhibit collective effects. A plasma is a collection of free charged particles moving in random directions that is, on the average, electrically neutral. Plasmas carry electrical currents and generate magnetic fields. Thermal plasmas are equilibrium plasmas and include technologies such as plasma jet, DC corona torch, plasma arc, etc. Non-thermal plasmas are non-equilibrium plasmas and may include glow discharge, radio frequency (RF), microwave technologies and the like. Thermal plasmas are typified by high electron and gas temperatures and high pressures of atmospheric or higher, whereas non-thermal plasmas have high electron temperatures, but relatively low gas temperatures and reduced pressure (<1 atm; <0.1 MPa) in most cases.

Non-thermal plasma techniques are either high pressure processes or not as flexible in general as RF non-thermal plasma in terms of gas and flow requirements for plasma generation, uniformity, pulsed or continuous wave options, duty cycle combinations, etc.

Thus, it would be desirable if a way were discovered to improve the activity, stability and/or selectivity of catalysts using a relatively less energy intensive and more versatile processes.

SUMMARY

There is provided, in one non-limiting embodiment, a method for preparing a catalyst that involves impregnating a catalyst support with a metal precursor, and treating the support with a RF plasma, where the RF plasma treatment is conducted before or after impregnating.

In another non-limiting embodiment of the invention, there is provided a catalyst prepared by the method including impregnating a catalyst support with a metal precursor and treating the support with a RF plasma, where the RF plasma treatment is conducted before or after impregnating.

In optional embodiments of the methods and catalysts herein, the RF plasma treatment is conducted at a temperature in the range of about 10 to about 150° C. In other non-restrictive alternative embodiments of the methods and catalysts herein, the gas or vapor for the plasma is air, hydrogen, argon, nitrogen, oxygen, water vapor, and/or liquid vapor. In another non-limiting embodiment, the RF plasma and the catalyst support are rotated 360° with respect to each other to provide for uniform treatment of the catalyst support.

DETAILED DESCRIPTION OF THE INVENTION

Figure 1:
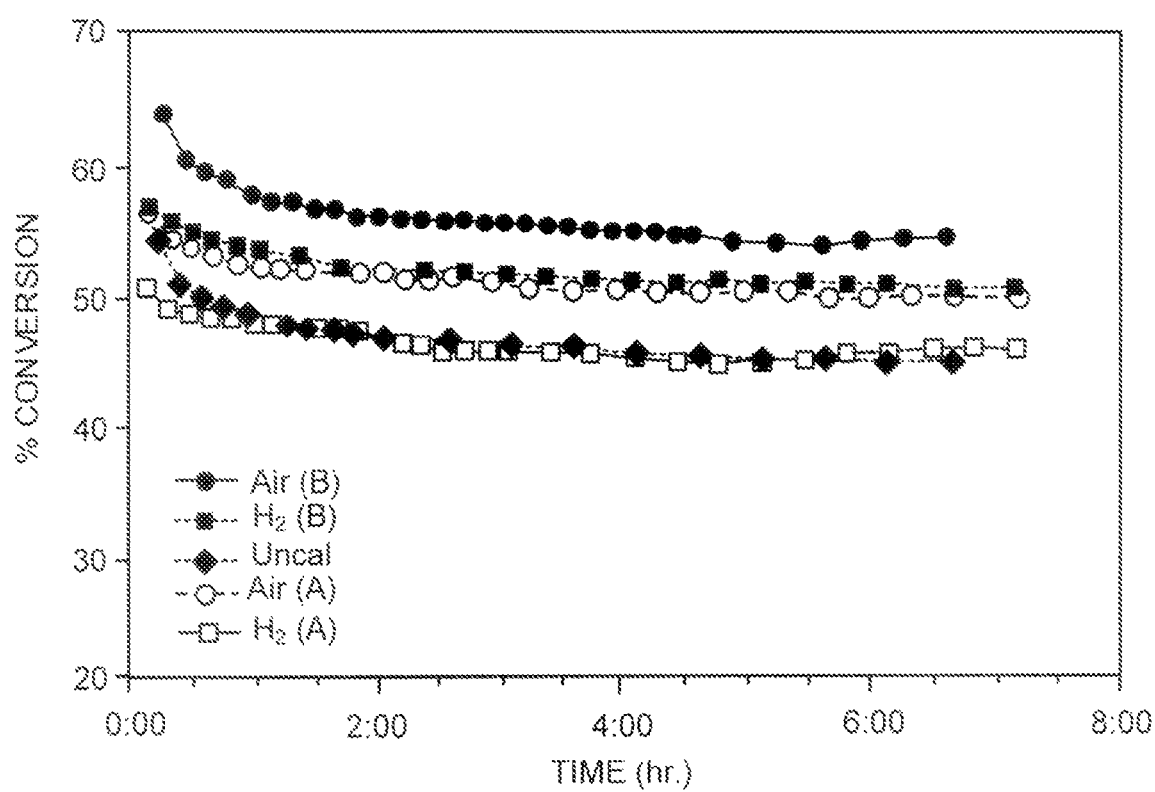
FIG. 1 is a plot of % conversion (activities of Ni catalysts prepared herein) as a function of time for benzene hydrogenation at 150° C. after reduction at 450° C.

It has been discovered that applying radio frequency (RF) non-thermal plasma treatments before and/or after impregnations of metal precursors on supports produce unusual and improved catalytic characteristics and properties for catalytic reactions. Metal precursors are defined herein as compounds or components that form a catalytically active material consisting of metal and/or metal oxide on a support when the catalyst is finished.

In one specific, non-limiting embodiment, it has been discovered that the activity and stability of nickel catalysts for benzene hydrogenation can be improved by air and/or hydrogen plasma treatment for up to 50% improvement in activity or stability. In another non-restrictive, but particular embodiment hydrogenation catalysts treated by hydrogen plasma have improved acetylene conversion and improved ethylene selectivity at low temperatures.

Hydrogenation of aromatic compounds is an important research area due to stringent environmental regulations on the content of aromatics in fuels. More specifically, levels of benzene are controlled and specified. Nickel catalysts have been widely studied for the reaction because of their high activity and relatively low cost. This invention focuses in one non-limiting aspect on the development of the RF plasma technique to improve the activity and stability of Ni catalysts for the removal of aromatics from fuels and for benzene hydrogenation to cyclohexane because plasma-based techniques for catalyst preparation have recently been used to develop catalytic materials with unusual catalytic properties including high metal dispersion and better stability.

The selective hydrogenation of acetylene is another important industrial process for the purification of ethylene feedstock used in the polymerization industry. A supported palladium catalyst is regarded as one important catalyst with good activity and selectivity for the selective reaction to remove acetylene, that is hydrogenate acetylene ($C_2H_2$) to ethylene ($C_2H_4$). As with the Ni catalysts, the plasma treatment is expected to effectively improve the active metal's surface dispersion on the support, and also to enhance the catalyst's performance. It will be appreciated however that the methods and catalysts made by the methods described herein are not limited to hydrogenation catalysts, but are expected to find applicability to catalysts for oxidation, partial oxidation, hydrodesulfurization, hydrodenitrogenation, isomerization, etc.

One goal is to demonstrate the unique capability of RF plasma technique to improve the efficiency of various catalytic processes by controlling the metal dispersion and the interaction between metals and supports. Other goals include maintaining high surface areas and achieving high metal dispersion. However, it will be appreciated that the methods and techniques described herein for Ni and Pd hydrogenation catalysts are expected to be applied with similar benefits to catalysts employing other metals and metal oxides, including but not necessarily limited to, iron, gold, silver, platinum, cobalt, rhodium, ruthenium, niobium, and combinations thereof.

In general, RF plasmas are known. In this context, by RF is meant a range of from about 5 to about 50 MHz. In one non-limiting embodiment herein, the RF plasma treatment is conducted at a temperature from the range of about 0° C. up to about 200° C. In another, alternate embodiment, the lower end of the range may be about 10° C. and the upper end may be about 100° C. Further, the continuous wave RF plasma treatment may be conducted for a period of time between about 1 minute to several hours, for instance about 100 hours, alternatively from about 1 minute to about 10 hours. Besides the continuous wave function of the plasma treatment, the pulsed function of the plasma treatment can be applied. The duty cycle (on/off cycle) of the pulsed RF plasma treatment can be ranged from nanoseconds to several minutes, for instance from about 1 nanosecond to about 10 minutes, for a period of time between about 10 minutes to about several days, or about 10 days.

The RF-plasma is may be, but is not necessarily limited to, a RF air plasma and an RF hydrogen plasma, and combinations thereof. Other gases that may be used include, but are not necessarily limited to, argon, nitrogen, oxygen, water vapor, and the like, and combinations thereof. Suitable liquid vapor plasmas besides water vapor include, but are not necessarily limited to ethanol, hydrogen peroxide, ammonia, and combinations thereof. The RF plasma treatment is conducted for a pressure from a lower end of about 0.01 torr (about 1 Pa) to an upper end of about 20 torr (about 2700 Pa), and alternatively from a lower end of about 0.1 torr (13 Pa) to an upper end of about 2 torr (270 Pa). The power output may range from a lower level of about 10 watts to an upper level of about 1000 watts, alternatively from a lower level of about 25 watts to an upper level of about 500 watts.

The catalysts may be prepared using conventional, known impregnation, spraying and loading techniques. Procedures including, but not necessarily limited to, drying, decomposition, oxidation, reduction and combinations thereof, according to known or conventional techniques, or methods yet to be developed, may precede and/or follow impregnation.

Supports useful in the methods and catalysts of this invention include, but are not necessarily limited to alumina ($Al_2O_3$), silica ($SiO_2$), silica/alumina, zeolites, molecular sieves, gallia ($Ga_2O_3$), activated carbon, carbon black, titania ($TiO_2$) zirconia ($ZrO_2$), magnesium oxide (MgO), niobia, calcium carbonate ($CaCO_3$), and barium sulfate ($BaSO_4$) and combinations thereof.

The methods and catalysts herein will now be described with respect to certain specific embodiments which are intended to further explain the invention, but not limit it in any way.

EXAMPLES 1-10

Alumina ($Al_2O_3$) particles of size 20-40 mesh (425-850 microns) with 1.14 ml/g pore volume and 255 $m^2/g$ surface area, with or without plasma pre-treatments, were impregnated with calculated nickel nitrate solutions using the incipient wetness technique.

Plasma treatments were carried out in a custom-designed 360° rotating RF plasma system. By being able to rotate the catalyst relative to the plasma, the particles receive a more uniform treatment. The conditions of 400 mtorr (53 Pa) and 160 watts were used for both $H_2$ and air plasmas in these Examples. Typically, one gram of catalyst was loaded in the plasma chamber for plasma treatment, the time for plasma treatment ranged from 10 to 30 minutes using a continuous wave. The gas and flow rate setting for $H_2$ or air was from 6-10 cc/min.

The 5% Ni/$Al_2O_3$ catalysts tested included air (B—plasma treatment before impregnation), $H_2$(B), uncalcined, air (A—plasma treatment after impregnation), and $H_2$(A). A reaction study was carried out with a space velocity of about 63,000 cc/h-g catalyst at a temperature from 50-150° C. with a hydrogen to benzene ratio of 18 to 1. The activities of catalysts as a function of time on stream after reduction in $H_2$ at 450° C. are shown in FIG. 1. The activity goes through an initial fast decrease and quickly stabilizes followed by a slow decrease with time. As listed in Table I, the activity order of the five different 5% Ni/$Al_2O_3$ catalysts after 8 hours on stream was air(B)>$H_2$(B), air(A)>$H_2$(A), uncalcined. The best improvement of activity resulted from the air plasma "before impregnation" treatment with a 19% increase.

The results suggest both air and $H_2$ plasma modifications before the impregnation of nickel precursor are effective in improving the activity. However, only the air plasma modification after nickel precursor impregnation slightly improves the activity while the $H_2$ plasma has negligible effect. The improved activity of catalysts with plasma modifications is hypothesized to result from cleaned surfaces to stabilize smaller Ni metal particles to achieve higher dispersion; however it will be appreciated that the inventors do not want to be limited to any particular explanation.

Figure 2:
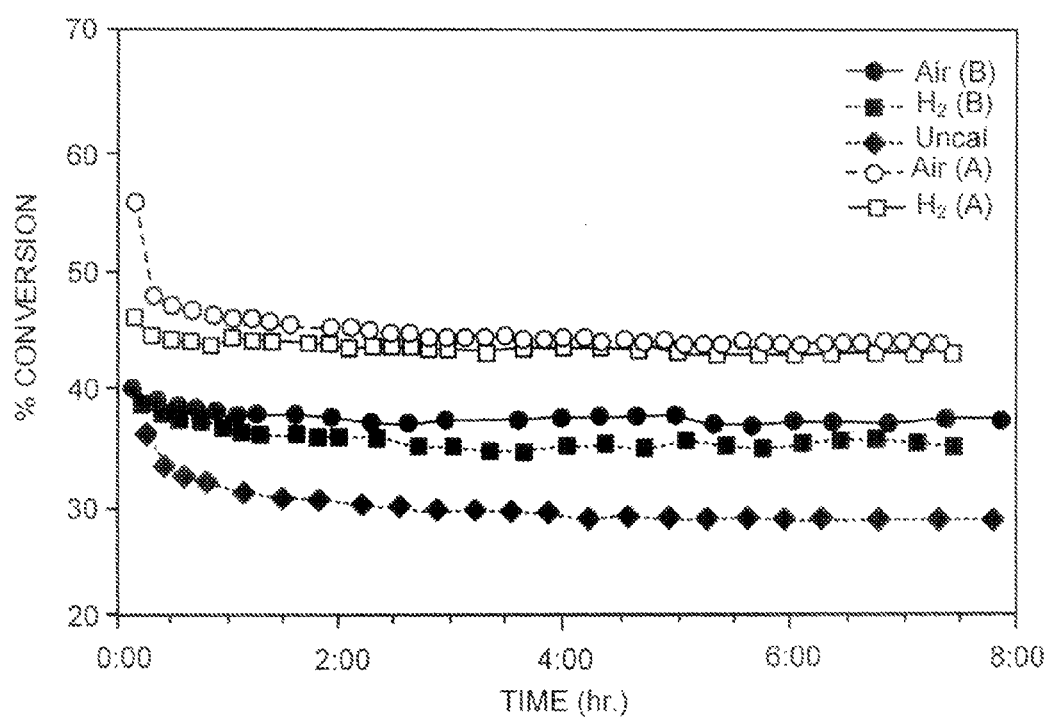
FIG. 2 is a plot of % conversion (activities of Ni catalysts prepared herein) as a function of time for benzene hydrogenation at 150° C. after extended reduction at 600° C.

To determine the plasma effect on catalytic stability an extended reduction in $H_2$ at 600° C. for 5 hours was used to speed up the deactivation. The activities of all catalysts were tested again under the same reactions as the catalyst with a reduction at 450° C. The results of conversions versus time are shown in FIG. 2. The stability order, again with results listed in Table I, after 8 hours on stream was air(A), H$_2$(A), >air(B), H$_2$(B), >uncalcined. The best stability improvement resulted from the H$_2$ plasma "after impregnation" treatment, with a 50% increase.

TABLE I

Activity and Stability of Ni Catalysts With or Without Plasma Treatments for Benzene Hydrogenation at 150° C.

| | | % benzene conversion after 8 hours on stream | | | |
|---|---|---|---|---|---|
| Ex. | Catalyst | Reduction at 450° C. | % Increase[1] | Ex. | Reduction at 600° C. | % Increase[1] |
| 1 | Air(B)[2] | 55.8 | +19.0 | 6 | 36.9 | +25.1 |
| 2 | H$_2$(B) | 52.1 | +11.1 | 7 | 35.2 | +19.3 |
| 3 | No treatment | 46.9 | NA | 8 | 29.5 | NA |
| 4 | Air(A)[2] | 51.2 | +9.2 | 9 | 44.2 | +50.0 |
| 5 | H$_2$(A) | 46.3 | −1.3 | 10 | 43.0 | +45.8 |

[1]Compare to the uncalcined.
[2](B): before impregnation; (A): after impregnation Plasma modification before and after impregnation and metal precursors are effective in improving the activity of Ni catalysts for benzene hydrogenation. Plasma modification before impregnation is slightly more effective than the plasma modification after impregnation. However, plasma modification after impregnation increases the stability of the catalysts much more than that of catalysts with plasma modification before the impregnation. The economic benefit of much improved stability of Ni catalysts for hydrogenation of benzene appears significant. Similar benefits for various catalysts and other industrial processes can be expected via plasma techniques.

EXAMPLES 11-18

Palladium on gamma-alumina catalysts, both reduced and non-reduced, calcined and uncalcined, some treated with hydrogen plasma according to the methods described herein were prepared and used to selectively hydrogenate acetylene.

The catalyst preparation method involved impregnation with palladium nitrate, at 120° C., dry for 12 hours. The composition was 1 wt % Pd/γ-Al$_2$O$_3$. The plasma treatment for Examples 11-18 was similar to that for Examples 1-2, 4-7, and 9-10 above using a 360° rotating plasma system, with a continuous wave at 160 W, 13.56 MHz and 400 mtorr (53 Pa).

The hydrogenation reactions were conducted in an on-line microreactor system. The hydrogenation test conditions included a GHSV of 84,000 h$^{-1}$ and a feed composition of 1.13% C$_2$H$_2$; 4.75% H$_2$, and 94.10% C$_2$H$_4$.

The catalysts are defined according to Table II.

TABLE II

Pd/γ-Al$_2$O$_3$ Acetylene Hydrogenation Catalysts

| Ex. | Catalyst |
|---|---|
| 11 | 300° C. calcination; in-situ hydrogen reduction at 300° C. for 2 hours |
| 12 | 500° C. calcination; in-situ hydrogen reduction at 300° C. for 2 hours |
| 13 | uncalcined; in-situ hydrogen reduction at 300° C. for 2 hours |
| 14 | H$_2$ plasma treated; in-situ hydrogen reduction at 300° C. for 2 hours |
| 15 | uncalcined; no hydrogen reduction treatment |
| 16 | 500° C. calcination; no hydrogen reduction treatment |
| 17 | 300° C. calcination; no hydrogen reduction treatment |
| 18 | H$_2$ plasma treated; no hydrogen reduction treatment |

Figure 3:
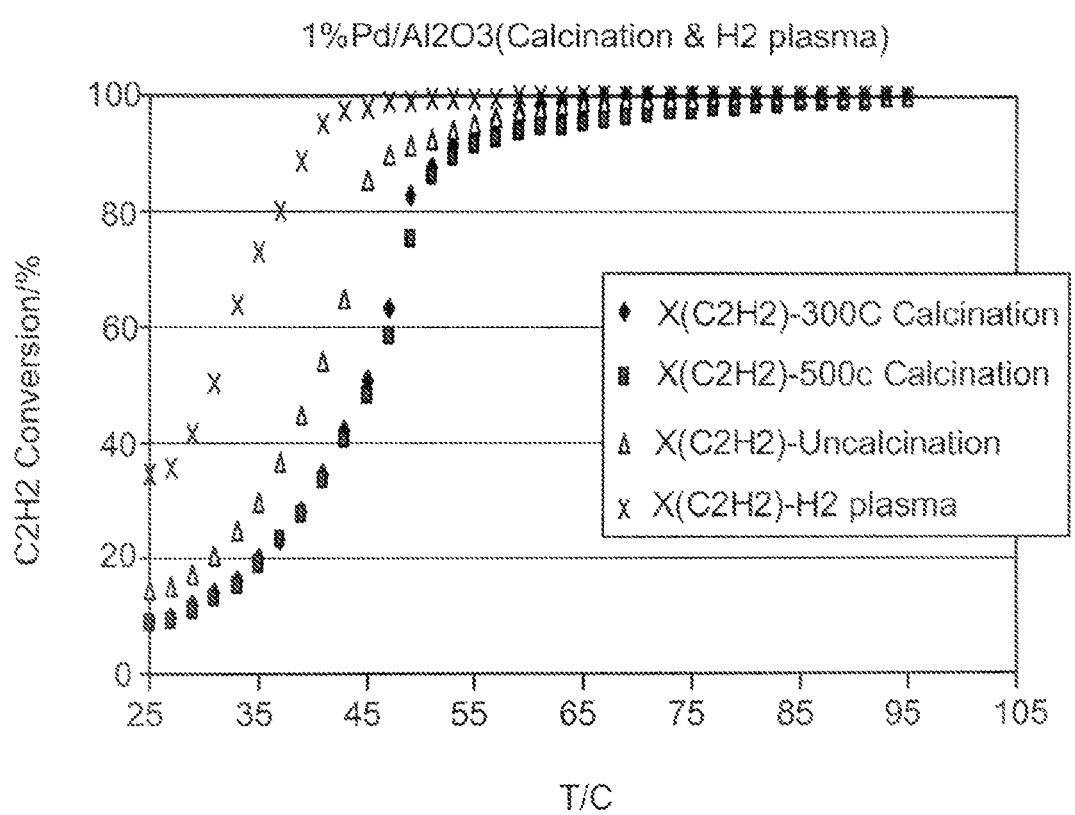
FIG. 3 is a plot of acetylene conversion as a function of temperature for a 1% Pd on alumina for calcined catalysts, an uncalcined catalyst, and a catalyst treated with hydrogen plasma, all with in-situ hydrogen reduction treatment for 2 hours.
Figure 4:
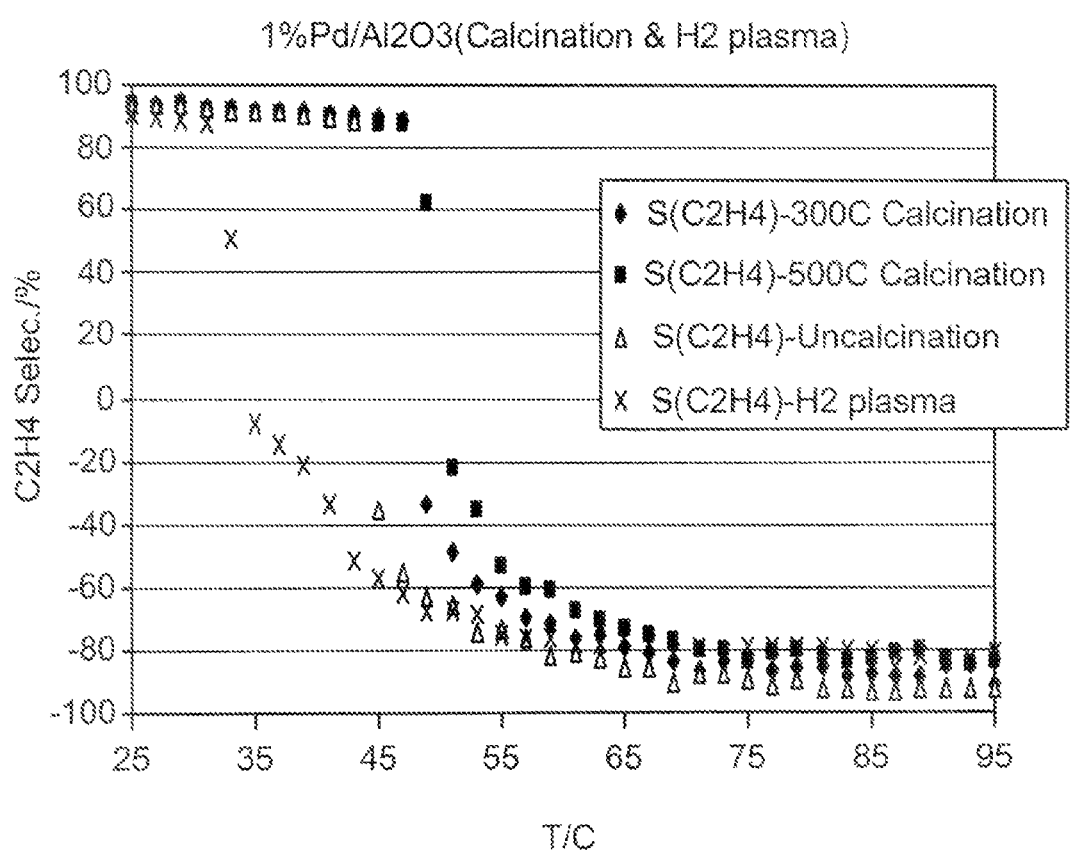
FIG. 4 is a plot of ethylene selectivity from acetylene as a function of temperature for a 1% Pd on alumina for the catalysts of FIG. 3.

Shown in FIGS. 3 and 4 are comparisons of catalyst performance between calcined catalysts (Examples 11 and 12) and a catalyst treated with hydrogen plasma (Ex. 14), as well as an uncalcined catalyst (Ex. 13). FIG. 3 is a comparison of acetylene conversion as a function of temperature, whereas FIG. 4 is a plot of ethylene selectivity as a function of temperature. It may be seen in FIG. 3 that the catalyst treated with the H$_2$ plasma (Ex. 14) exhibits the highest C$_2$H$_2$ conversion between the temperatures of 25 and 55° C. All catalysts show a similarly high C$_2$H$_4$ selectivity (more than 90%) with the 25-31° C. temperature range in FIG. 4.

Figure 5:
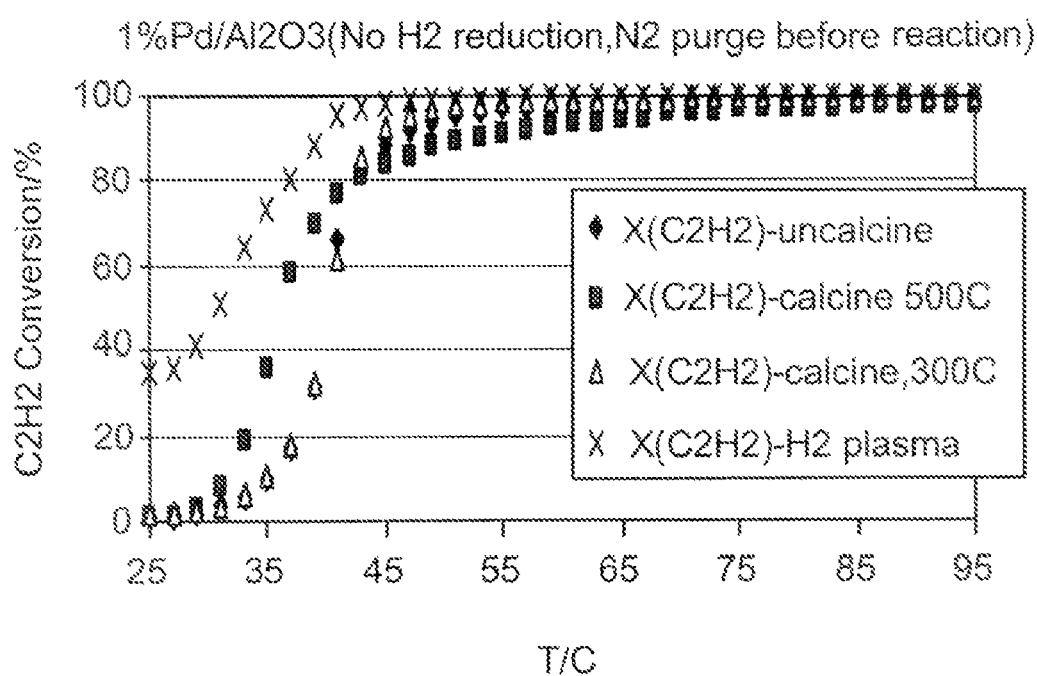
FIG. 5 is a plot of acetylene conversion as a function of temperature for a 1% Pd on alumina for calcined catalysts, an uncalcined catalyst, and a catalyst treated with hydrogen plasma, all without in-situ hydrogen reduction treatment.
Figure 6:
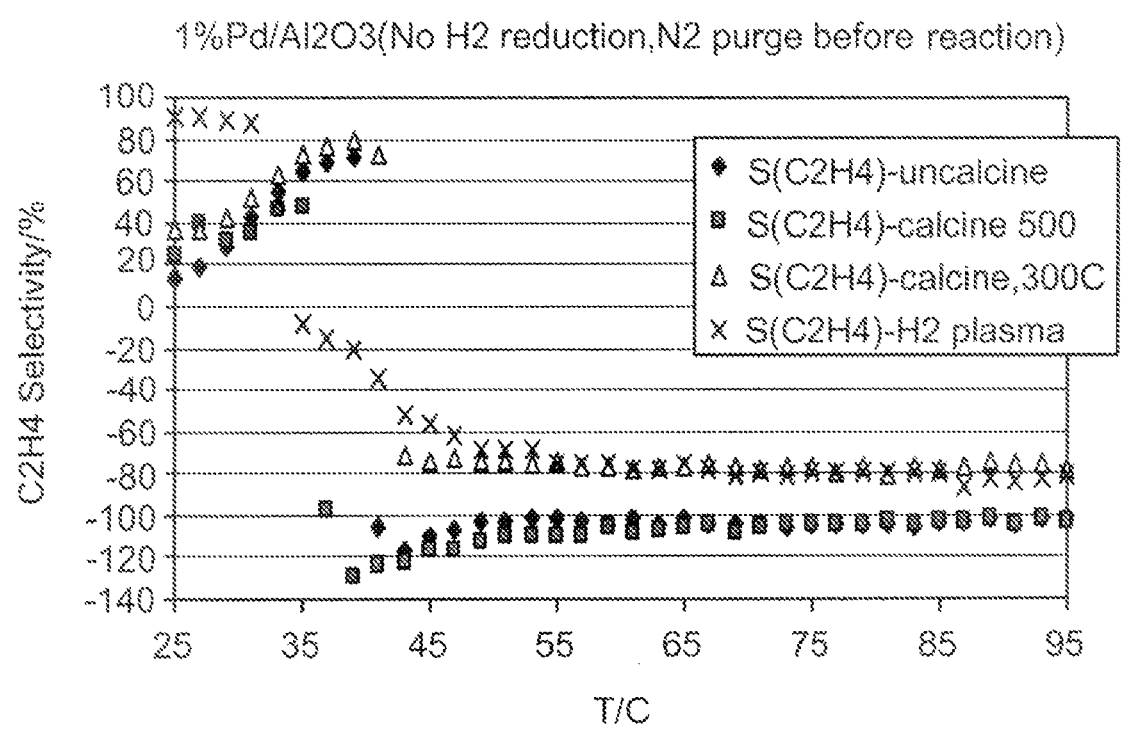
FIG. 6 is a plot of ethylene selectivity from acetylene as a function of temperature for a 1% Pd on alumina for the catalysts of FIG. 5.

With respect to the catalysts that did not receive an in-situ H$_2$ reduction treatment, FIGS. 5 and 6 demonstrate that the catalyst treated with H$_2$ plasma (Ex. 18) shows the best conversion and selectivity. The results also indicate that plasma treatments may convert part of the palladium nitrate (such as to palladium or palladium oxide in a non-limiting embodiment), and that the resulting palladium metal can greatly improve the selectivity reaction.

EXAMPLES 19-24

The activity and stability of Ni/SiO$_2$ catalysts for benzene hydrogenation was studied in a manner similar to the above Examples 1-10, and the catalysts were prepared by a similar procedure, except as noted.

The activity of 5% Ni/SiO$_2$ catalysts was found to increase in the following order: uncalcined<H$_2$(A)<air(A). The results of air plasma treatment on Ni/SiO$_2$ confirm the high performance of the catalyst prepared by air plasma modification. The stability study also supports that the hydrogen plasma modification can improve the stability of 5% Ni/SiO$_2$ catalysts. As reported, the stability order is H$_2$(A)>air(A)~uncalcined.

Figure 7:
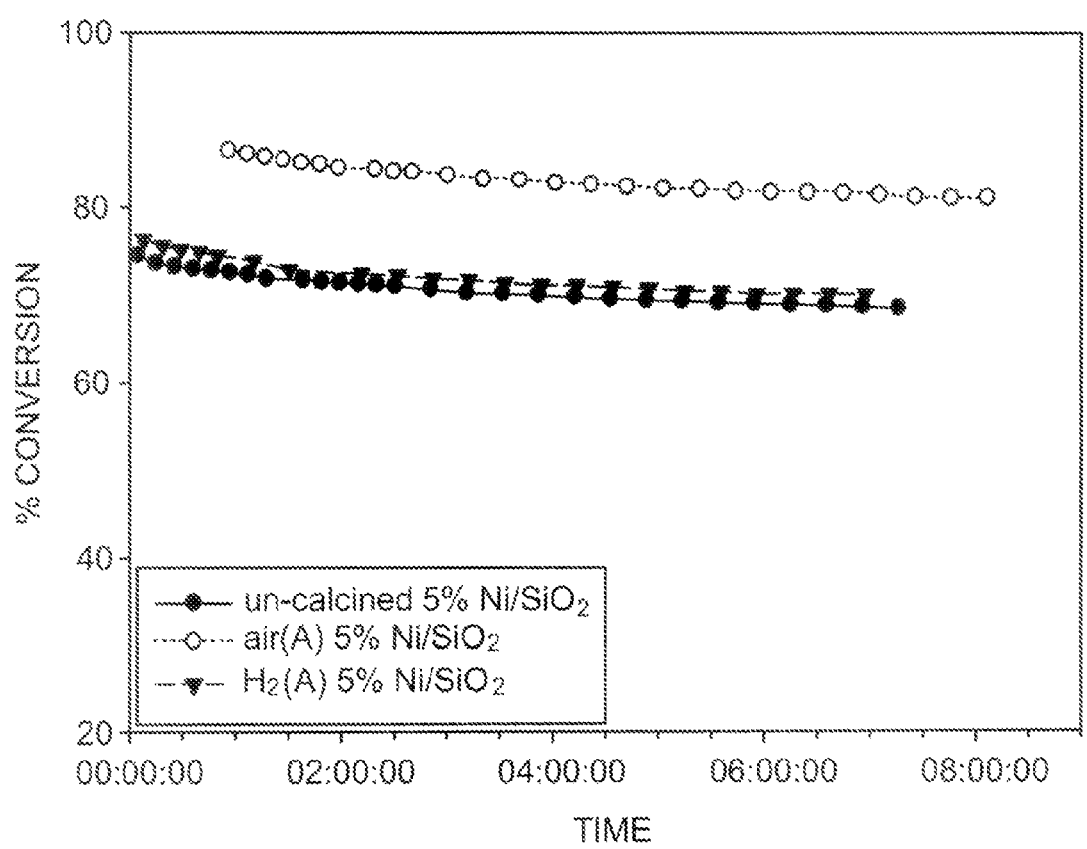
FIG. 7 is plot of benzene hydrogenation % conversion as a function of time showing the activities of 5% Ni/SiO$_2$ catalysts as treated by an air plasma after impregnation, a hydrogen plasma after impregnation and an uncalcined catalyst after reduction at 450° C.
Figure 8:
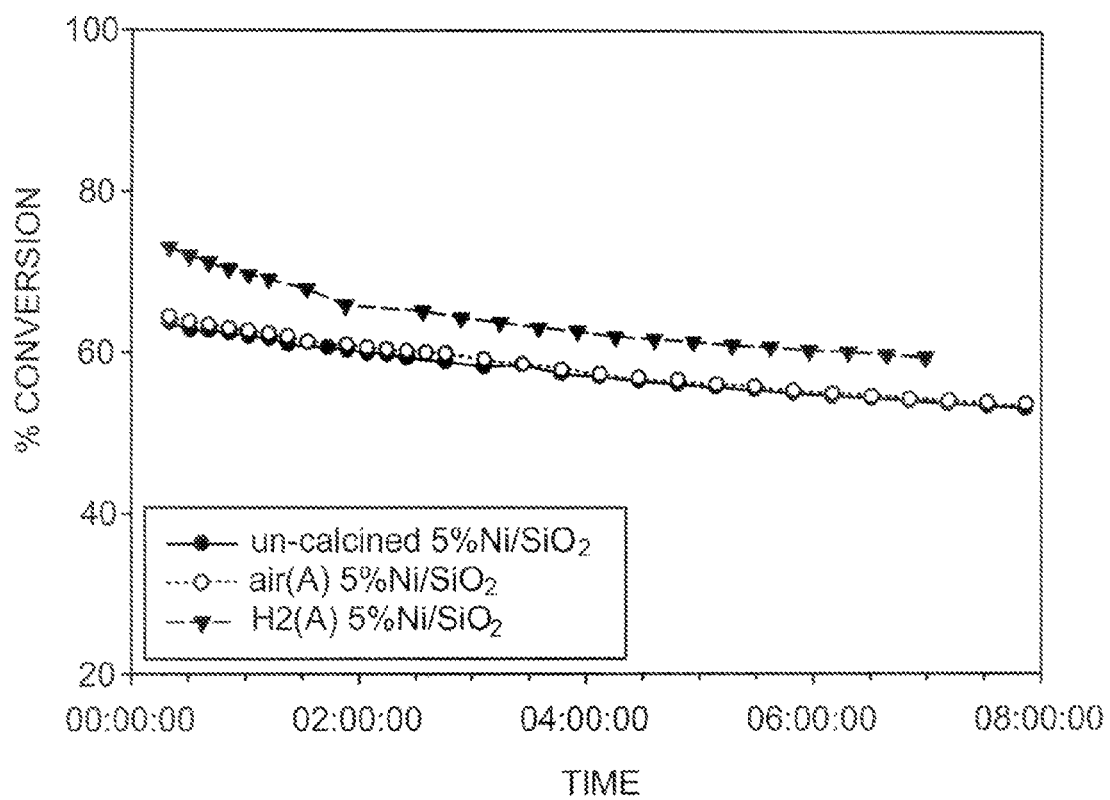
FIG. 8 is plot of benzene hydrogenation % conversion as a function of time showing the activities of 5% Ni/SiO$_2$ catalysts as treated by an air plasma after impregnation, a hydrogen plasma after impregnation and an uncalcined catalyst after reduction at 600° C.

The results of conversion versus time of all Ni/SiO$_2$ catalysts reduced at 450° C. are 600° C. are shown in FIGS. 7 and 8, respectively. The calculated percent decrease from the activity of catalysts with 450° C. reduction to that with 600° C. reduction is summarized in Table III. The results suggest that the catalyst with the hydrogen plasma modification after impregnation is the most stable. As summarized in Table III, both air and hydrogen plasma treatments after impregnation enhances the activity and/or stability of silica supported nickel catalysts whereas the air plasma does not significantly increase the stability. The stability enhancement was hypothesized due to the strong metal-support interaction (SMSI) effect caused by the plasma treatments. However, the detailed mechanism of effects on activity, stability, or the metal-surface interaction has not been unequivocally determined yet, and the inventors do not wish to be limited or restricted by any theory or explanation.

TABLE III

Activities of Silica Supported Ni catalysts for Benzene Hydrogenation.

| Ex. | Catalyst | % Conversion; reduced at 450° C. | Ex. | Changes compared to the uncalcined catalyst | % Conversion; reduced at 600° C. | Changes compared to the uncalcined catalyst |
|---|---|---|---|---|---|---|
| 19 | Uncalcined | 68.7 | 22 | NA | 54.1 | NA |
| 20 | Air(A) | 81.4 | 23 | +18.5% | 54.3 | +0.4% |
| 21 | H$_2$(A) | 70.1 | 24 | +2.0% | 59.5 | +10.0% |

The advantages of the methods discussed herein over traditional catalyst preparation techniques include, but are not necessarily limited to:
  Easy operation, one can use a wide variety of gases to generate plasma for treatments;
  Low temperature process which minimizes energy cost and possible metal sintering; and
  Versatile, wide ranges of parameters such as gas, wattage, duty cycle, time, flow, and pressure are possible to enhance catalytic properties.
  Improved selectivity to the desired product.
  Catalysts having improved activity, selectivity and/or improved stability.
  Catalysts having high surface areas.
  Catalysts having high metal dispersions.
  Preparation methods that involve relatively short treatment times.
  Catalysts with well controlled surface chemical composition.
  Catalysts with well controlled surface chemical structure.
  Catalysts with well controlled metal-support interface.
  Catalysts with unique metal-support interaction.
  Uniform plasma treatments of the catalysts.
  Easy adjustment of the processing parameters.
  Relatively low gas flow rates and less exhaust gases.
  Relatively low overall cost.
Possible disadvantages or limitations of the methods herein may be that because the technique is so versatile, it may take some time to find the optimum condition for the best treatment toward specific catalysts for particular reactions. A fundamental understanding of the plasma effect on surface properties may greatly reduce the optimization time.

In the foregoing specification, the invention has been described with reference to specific embodiments thereof, and has been demonstrated as effective for producing improved catalysts. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of metal precursors, supports, plasmas, and plasma treatment conditions, as well as production sequence, falling within the claimed parameters, but not specifically identified or tried in a particular method to make catalysts herein, are anticipated to be within the scope of this invention. It is expected that the catalysts of this invention may also have particular utility in improved reactions and reaction products.

What is claimed is:

1. A method for preparing a catalyst comprising: impregnating a catalyst support with at least one catalytically active metal precursor, treating the support with a continuous wave or pulsed RF plasma at a temperature in the range of about 10 to about 150° C., where the RF plasma treatment is conducted after impregnating, where the RF plasma and the catalyst support are rotated 360° with respect to each other, and where the RF plasma is a RF plasma of a gas or vapor selected from the group consisting of air, hydrogen, argon, nitrogen, oxygen, water vapor, liquid vapor, and combinations thereof; and producing a catalyst.

2. The method of claim 1, where the RF plasma treatment is conducted with a continuous wave function for a period of time between about 1 minute to about 100 hours.

3. The method of claim 1, where the RF plasma treatment is conducted with a pulsed function for a duty cycle from 1 nanosecond to 10 minutes.

4. The method of claim 1, where the RF plasma treatment is conducted with a pulsed function for a period of time between about 10 minutes and about 10 days.

5. The method of claim 1, where the RF plasma treatment is conducted at a frequency from about 5 MHz to about 50 MHz.

6. The method of claim 1, wherein the support is exposed to a treatment selected from the group consisting of drying, decomposition, oxidation, and reduction.

7. The method of claim 1, where the catalyst has at least one improved property selected from the group consisting of activity, selectivity, stability and combinations thereof, as compared to an otherwise identical catalyst prepared without the RF plasma treatment.

8. The method of claim 1, where the catalyst is a metal catalyst and the metal is selected from the group consisting of nickel, palladium and combinations thereof.

9. The method of claim 1 where the RF plasma treatment is conducted at a pressure of from about 0.1 torr to about 2 torr (about 13 to about 270 Pa).

10. The method of claim 1 where the RF plasma treatment is conducted at a power output of from about 10 watts to about 1000 watts.

11. The method of claim 1 where the metal precursor comprises a metal selected from the group consisting of nickel, iron, gold, silver, platinum, cobalt, palladium, rhodium, ruthenium, niobium, and combinations thereof.

12. The method of claim 1 where the support is selected from the group consisting of alumina (Al$_2$O$_3$), silica (SiO$_2$), silica/alumina, zeolites, molecular sieves, gallia (Ga$_2$O$_3$), activated carbon, carbon black, titania (TiO$_2$), zirconia (ZrO$_2$), magnesium oxide (MgO), niobia, calcium carbonate (CaCO$_3$), and barium sulfate (BaSO$_4$), and combinations thereof.

* * * * *